United States Patent
Sumi (10) Patent No.: US 9,430,970 B2
(45) Date of Patent: Aug. 30, 2016

(54) 3D IMAGE DISPLAY DEVICE

(71) Applicant: InnoLux Corporation, Miao-Li County (TW)

(72) Inventor: Naoki Sumi, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 108 days.

(21) Appl. No.: 14/532,081

(22) Filed: Nov. 4, 2014

(65) Prior Publication Data

US 2016/0125814 A1    May 5, 2016

(51) Int. Cl.
*G09G 3/34* (2006.01)
*G09G 3/20* (2006.01)
*G09G 3/36* (2006.01)

(52) U.S. Cl.
CPC .......... *G09G 3/3406* (2013.01); *G09G 3/2074* (2013.01); *G09G 3/36* (2013.01); *G09G 2320/068* (2013.01); *G09G 2320/0646* (2013.01); *G09G 2340/04* (2013.01)

(58) Field of Classification Search
CPC .................. G09G 2320/068; G09G 2340/04; G09G 3/3406; G02B 27/2207; G02B 27/2214; H04N 13/0409; H04N 13/0452
See application file for complete search history.

(56) References Cited

U.S. PATENT DOCUMENTS

2013/0107340 A1* 5/2013 Wong ................. G02B 26/0816
                                                      359/222.1

FOREIGN PATENT DOCUMENTS

TW        201407191 A      2/2014

* cited by examiner

*Primary Examiner* — Abbas Abdulselam
(74) *Attorney, Agent, or Firm* — Bacon & Thomas, PLLC (57) ABSTRACT

A 3D image display device includes a backlight unit for generating an original light, a display panel, a light modulating unit, and a controller connected to the display panel and the light modulating unit. According to a first signal, the original light passes through the display panel generates a first light, the first light passes through the light modulating unit, and has a first position on an objective plane parallel to the display panel. According to a second signal, the original light passes through the display panel to generate a second light, the second light passes through the light modulating unit and has a second position on the objective plane, wherein the first position is different from the second position.

17 Claims, 9 Drawing Sheets

3D IMAGE DISPLAY DEVICE

BACKGROUND OF THE INVENTION

1. Field of the Invention

The present invention relates to an image display device and, more particularly, to a 3D image display device.

2. Description of Related Art

Currently, the display of 3D image in the 3D image display device is achieved by using technologies to form binocular disparity of eyes of an observer. However, the observer usually needs to wear a pair of 3D eyeglasses to watch the display of 3D image. Even though autostereoscopy technique provided for allowing observers to view 3D image without wearing 3D eyeglasses has been applied to the display device, autostereoscopy technique is not satisfactory in depth of field and accommodation to human eyes. Hence, it still needs to use two eyes of the observer for 3D image formation.

Figure 1:
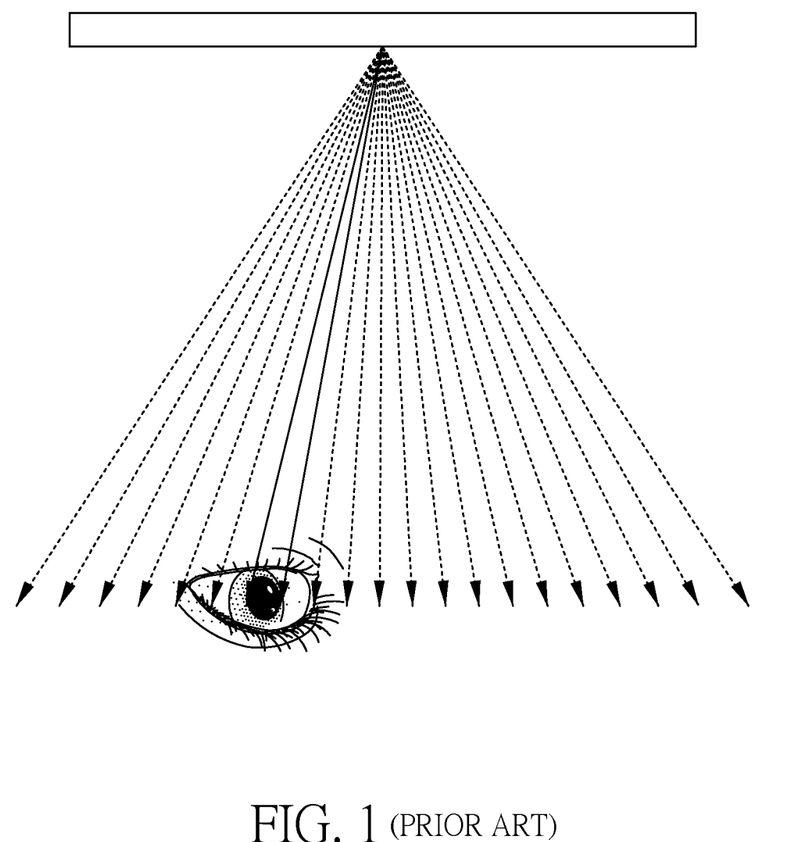
FIG. 1 is a schematic diagram of 3D image display system (SMV system) of prior art.

FIG. 1 is a system known as a super multi view (SMV) system for providing the 3D image that can be seen by the observer with single eye. The system divides an image data into 72 to 128 light paths, and one of the observer's eyes receives at least two of the 72 to 128 light paths. Every two light paths received by the observer's eye form an acute angle of 0.2 to 0.4 degrees, so that the observer is capable to see a 3D image by single eye. However, in the system, one image data needs to be divided into at least 72 parts, and only two parts can be received by the observer. It results in a great amount of resolution loss. Hence, it is desirable to provide an improved 3D image system to mitigate and/or obviate the aforementioned problems.

SUMMARY OF THE INVENTION

The object of the invention is to provide a 3D image display device, with which the observer can see a 3D image by single eye and the resolution loss of the 3D image can be greatly decreased.

In one aspect of the invention, there is provided a 3D image display device, which comprises: a backlight unit for generating an original light; a display panel having a plurality of pixels; a light modulating unit, wherein the display panel deposited between the backlight unit and the light modulating unit; and a controller connected to the display panel and the light modulating unit, the controller providing a first signal to both of the display panel and the light modulating unit in a first time, and providing a second signal to the both of display panel and the light modulating unit in a second time, the first time being different from the second time; wherein the original light passes through the display panel according to the first signal to generate a first light in the first time, the first light passes through the light modulating unit, and has a first position on an objective plane parallel to the display panel; and the original light passes through the display panel according to the second signal to generate a second light in the second time, the second light passes through the light modulating unit, and has a second position on the objective plane, and the first position is different from the second position. The 3D image display device changes the light path via the light modulating unit, and generates image data of different position on the pupil. Thus the observer can see a 3D image data by one eye, and an image data doesn't need to be divided into 72 to 128 parts by the 3D image display device, thus resolution loss can be decreased.

In another aspect of the invention, there is provided a 3D image display device, which includes: a backlight unit for generating an original light; a display panel having a plurality of pixels; a light modulating unit, wherein the display panel deposited between the backlight unit and the light modulating unit; and a controller connected to the display panel for providing a first signal to the display panel in a first time; and for providing a second signal to the display panel in a second time; wherein the original light passes through the display panel according to the first signal to generate a first light in the first time, and the first light passes through the light modulating unit, and has a first position on an objective plane parallel to the display panel; and the original light passes through the display panel according to the second signal to generate a second light in the second time, the second light passes through the light modulating unit, and has a second position on the objective plane parallel to the display panel, and the first position is different from the second position. The 3D image display device generates image data of different time on the pupil via the lights pass through the light modulating unit. Thus the observer can see a 3D image data by one eye too, and an image data doesn't need to be divided into 72 to 128 parts by the 3D image display device, thus resolution loss can be decreased.

Other objects, advantages, and novel features of the invention will become more apparent from the following detailed description when taken in conjunction with the accompanying drawings.

DETAILED DESCRIPTION OF THE PREFERRED EMBODIMENT

Figure 2A:
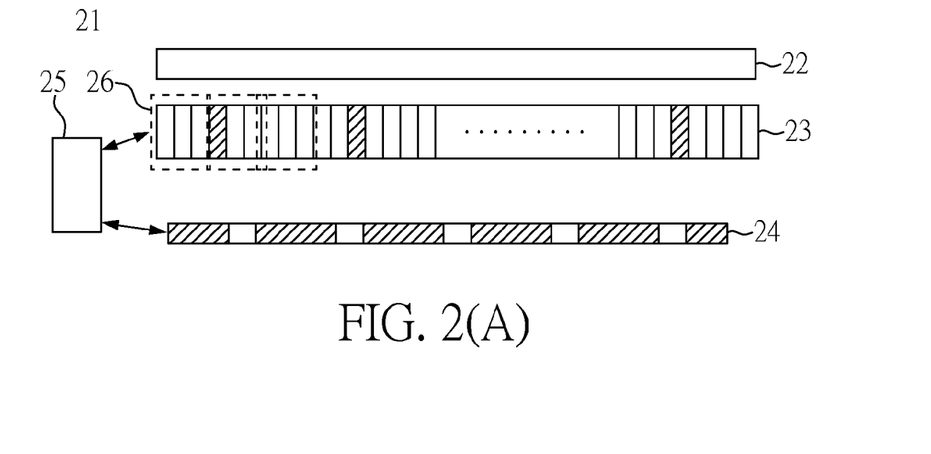
FIG. 2(A) is a schematic diagram to schematically illustrate the structure of a 3D image display device according to a first embodiment of the present invention.

Please refer to FIG. 2(A). FIG. 2(A) schematically illustrates the structure of a 3D image display device 21 according to a first embodiment of the invention. As shown in FIG. 2(A), the 3D image display device 21 includes a backlight unit 22, a display panel 23, a light modulating unit 24, and a controller 25. The backlight unit 22 is used to generate an original light. The display panel 23 has a plurality of pixels 26 that are respectively used to generate an image data, and each of the pixels are composed of at least three of subpixels, wherein total image data can form the image. The light modulating unit 24 is used to change the path of the original light. The controller 25 is electrically connected to the display panel 23 and the light modulating unit 24 for providing a control signal to control the display panel 23 and the light modulating unit 24. When the 3D image display device 21 is operated, the controller 25 provides a first signal to the display panel 23 and the light modulating unit 24 in a first time, and further provides a second signal to the display panel 23 and the light modulating unit 24 in a second time, wherein the first time and the second time are different and the interval there between is very short. Besides, the display panel 23 is deposited between the backlight unit 22 and the light modulating unit 24.

The display panel 23 generates an image (i.e. a full image) based on the signal transmitted from the controller 25. The image can be divided into a plurality of image data generated by the pixels 26, and each image data is a part of the image. Furthermore, when the light passes through one image data and the light modulating unit 24, the light with the image data can be formed to field of views. The number of field of views is preferably less than 72 (not shown in figures). For example, light with the image data is divided into merely 8 field of views in the present embodiment which are more less than 72 to 128 light paths as described in the art, so that the resolution loss can be decreased. Besides, it is noted that the number of field of views is not limited to 8, but it should be less than 72.

In addition, these 8 fields of view are allocated based on a usual multiview 3D optical design and give us autostereoscopic vision by binocular disparity. For example, when the right eye sees the view 4, then the left eye sees the view 6 and the observer can see the 3D by two eyes.

Figure 2B:
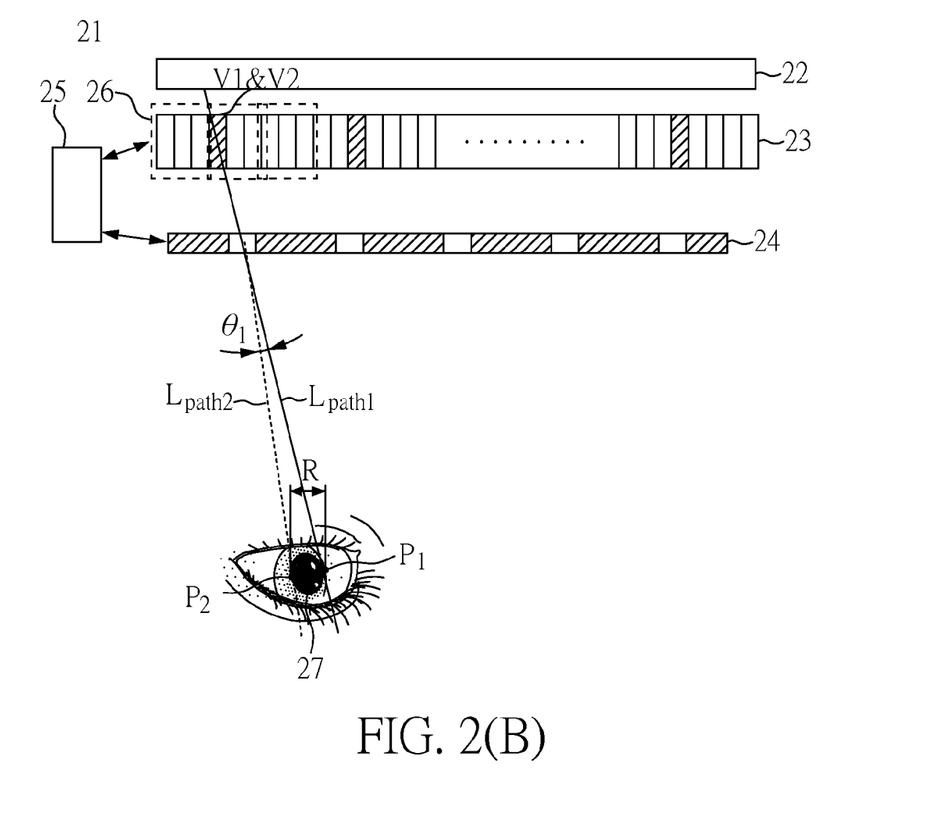
FIG. 2(B) is a schematic diagram to schematically illustrate the operating condition of FIG. 2(A)

Please refer to FIG. 2(B) which schematically illustrates the operating situation of FIG. 2(A). In the first time, the display panel 23 generates an image of the first frame V1 according to the first signal. The original light passes through the image of the first frame V1 (i.e. passes through the display panel 23) to generate a first light. The first light passes through the light modulating unit 24 to form a first light path $L_{path1}$. The first light has a first position p1 on an objective plane 27 parallel to the display panel 23. According to the second signal in the second time, the display panel 23 generates a image of the second frame V2. The original light passes through the image of the second frame V2 (i.e. passes through the display panel 23) to generate a second light. The second light passes through the light modulating unit 24 to form a second light path $L_{path2}$. The second light has a second position p2 on the objective plane 27. The first position p1 and the second position p2 are different; i.e., there is a distance R between the first position p1 and the second position p2.

The image of the first frame V1 and the image of the second frame V2 can be respectively defined as the image generated by same pixel 26 on the same position at different times. In other words, the image of the first frame V1 and the image of the second frame V2 are different image generated in different times on the same position of the display panel 23. Besides, the objective plane 27 is preferred but not limited to be a pupil of an observer. For clear description, the objective plane 27 is defined as a pupil hereinafter.

Because the interval between the first time and the second time is very short, the observer regards the image of the first frame V1 of the first position p1 on observer pupil and the image of the second frame V2 of the second position p2 on observer pupil as an image presented at the same time, and thus the image of the first frame V1 of the first position p1 and the image of the second frame V2 of the second position p2 can form a 3D image data. That is to say, when the image of the first frame V1 of all pixels are presented on the first position p1 of the pupil and the image of the second frame V2 of all pixels are presented on the second position p2 of the pupil, the observer can see the 3D image by one eye.

The controller 25 is able to control the light modulating unit 24 by the first signal and the second signal, so that the lights can continuously and alternatively form the first light path $L_{path1}$ and the second light path $L_{path2}$, wherein the distance R can be regarded as the size of a swing. Wherein, the first light path $L_{path1}$ is one of said field of views of the image of the first frame V1, and the second light path $L_{path2}$ is one of said field of views of the image of the second frame V2.

Besides, the first light path $L_{path1}$ and the second light path $L_{path2}$ form an acute angle θ1, and the acute angle θ1 is preferred to be 0.2 to 0.4 degrees. As a result, the observer can see satisfactory 3D image by single eye.

In addition, the first signal has a first frequency f1, and the second signal has a second frequency f2. Preferably, the first frequency f1 is different from the second frequency f2. The first frequency f1 and the second frequency are each preferred to be between 30 to 120 Hz.

Moreover, although a 3D image is formed by two different image data of two positions on the pupil 27 in this embodiment, the number of positions is not limited to two. Besides, the direction of the distance R on the pupil 27 is not limited (the direction of the distance R being parallel to the direction of two eyes in the present embodiment is for illustrative purpose only).

Figure 3A:
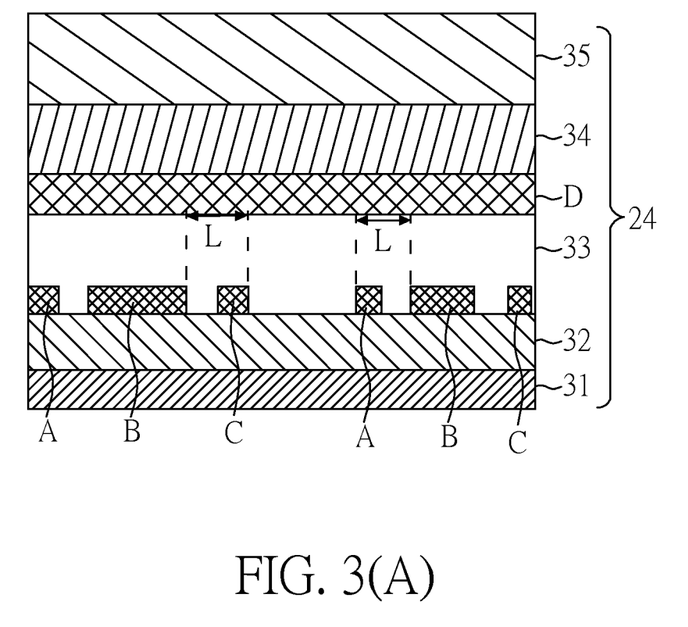
FIG. 3(A) is a schematic diagram of a first type of the light modulating unit according to the first embodiment of the invention.

FIG. 3(A) is a schematic diagram of a first type of the light modulating unit 24 according to the first embodiment of the present invention. The light modulating unit 24 is preferred but not limited to be a switchable liquid crystal barrier having a plurality of electrodes. The top part of the first type of the light modulating unit 24 faces the pupil 27, and the down part of the first type of the light modulating unit 24 faces the display panel 23. The first type of the light modulating unit 24 is preferably composed by a lower polarizer 31, a lower glass 32, a liquid crystal region 33, an upper glass 34, and an upper polarizer 35. A plurality of electrodes (A, B, C) are disposed in sequence on the lower glass 32 in the liquid crystal region 33, and an electrode (D) is disposed under the upper glass 34 in the liquid crystal region 33. The electrodes (A, B, C and D) are preferred but not limited to be ITO electrodes. Besides, the sizes of the electrodes (A, B, C) on the lower glass 32 can be the same or different.

Figure 3B:
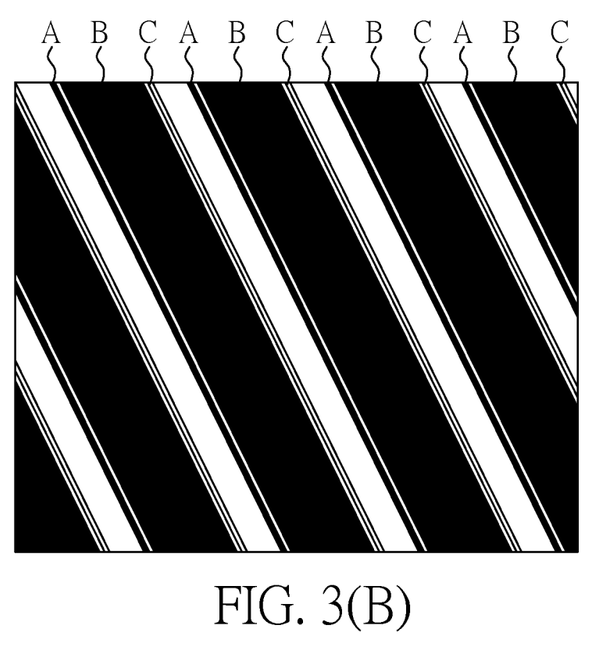
FIG. 3(B) is a schematic diagram of a first electrode pattern.
Figure 3C:
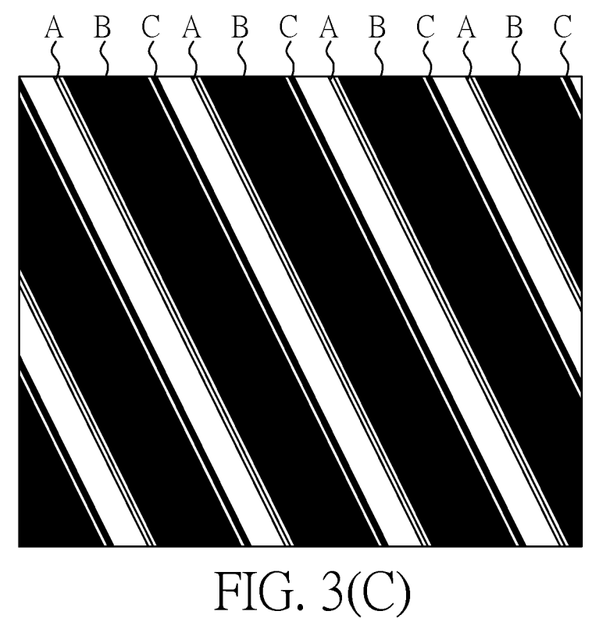
FIG. 3(C) is a schematic diagram of a second electrode pattern.

When receiving the first signal transmitted from the controller 25, the electrodes (A, B, C) on the lower glass 32 are selected to be applied with a voltage or not to be applied with the voltage. The applied voltage is used to turn on or turn off the electrodes (A, B, C). Each electrode is turned on when it is applied with the voltage so that the light cannot pass through the electrode, and each electrode is turned off when it is not applied with the voltage so that the light can pass through the electrode. Thus, the aforementioned arrangement of the electrodes (A, B, C) can form a first electrode pattern on the light modulating unit 24, as shown in FIG. 3(B). When receiving the second signal, the electrodes (A, B, C) on the lower glass 32 are selected again to be applied with a voltage or not to be applied with the voltage, so as to generate a second electrode pattern different from the first electrode pattern (as shown in FIG. 3(C)) according to different voltage application arrangement. Thus, the first light and the second light are able to generate different light paths by passing through the different electrode patterns. Besides, the electrode (D) under the upper glass 34 is continuously turned on.

In addition, with reference to FIG. 2(A) to FIG. 3(A), under the arrangement of the first type of the light modulating unit 24, the distance R between the first position p1 and the second position p2 is set to 2 mm to 4 mm that is slightly shorter than the pupil distance.

Wherein, a distance L between a left edge of the electrode A and a left edge of the electrode B and a distance L between a right edge of the electrode B and a right edge of the electrode C are same.

In another point of view, the distance L between the left edge of the electrode A and the left edge of the electrode B and also the distance L between the right edge of the electrode B and the right edge of the electrode C on FIG. 3(A) satisfied the following formula:

$$L = (k \times W_{pupil}/IPD) \times W_{sub\text{-}pixel} \quad (1),$$

where k is a constant of 1 to 2 that is defined by multiview 3D design, $W_{pupil}$ is a pupil diameter of the observer, IPD is a distance between the centers of two pupils of the observer and $W_{sub\text{-}pixel}$ is a sub-pixel width.

In an embodiment, $W_{pupil}$ is preferred but not limited to be 2 mm to 4 mm, and IPD is preferred but not limited to be 65 mm.

Figure 4:
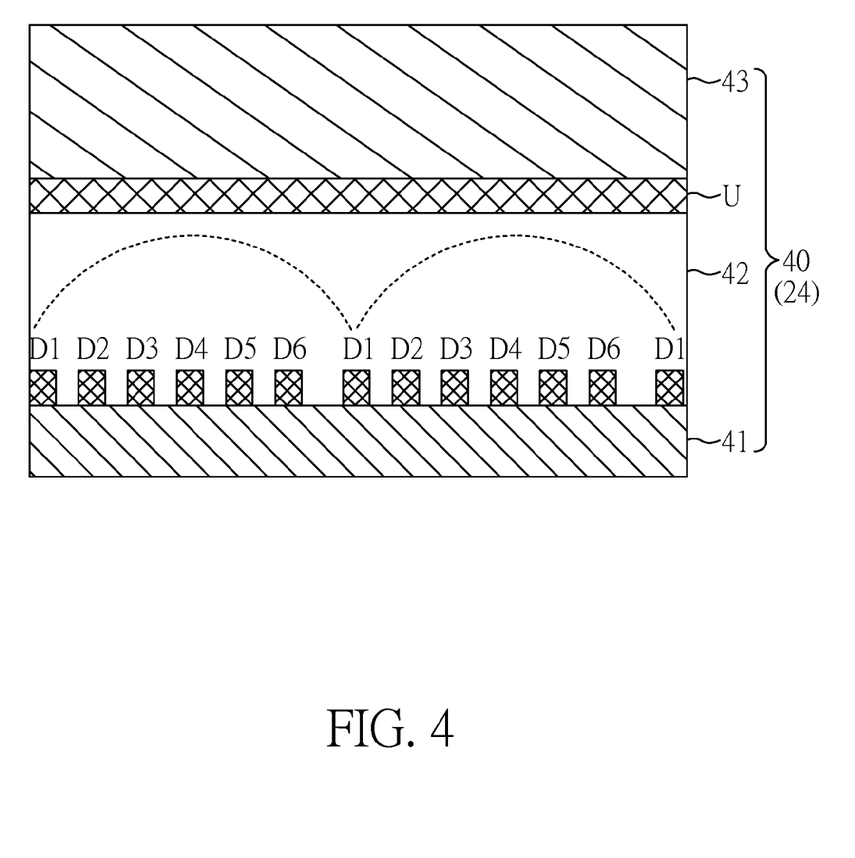
FIG. 4 is a schematic diagram of the second type of the light modulating unit.

FIG. 4 is a schematic diagram of the second type of the light modulating unit 24. The second type light modulating unit 24 is a switchable liquid crystal barrier, and the switchable liquid crystal barrier is a liquid crystal lens 40. The top part of the second type light modulating unit 24 faces the pupil 27, and the down part of the second type of the light modulating unit 24 faces the display panel 23. The liquid crystal lens 40 is preferred to be composed by a lower glass 41, a liquid crystal region 42, and an upper glass 43. Under the arrangement of the second type, the light modulating unit 24 is electrically connected to the display panel 23. A plurality of electrodes (D1 to D6) with the same size are disposed on the lower glass 41 in the liquid crystal region 42, and the electrodes (D1 to D6) are repeatedly arranged. An electrode (U) is disposed under the upper glass 43. The electrodes (D1 to D6, U)) are preferred but not limited to be ITO electrodes. Besides, the number of the electrodes (D1 to D6) is not limited to be 6.

When receiving the first signal transmitted from the controller 25, the electrodes (D1 to D6) on the lower glass 32 are selected to be applied with different voltage according to the first signal, so that the types of the electrodes (D1 to D6) are different, and thus the first light is refracted to form the first light path $L_{path1}$ when it passes through the electrodes (D1 to D6). When receiving the second signal, the electrodes (D1 to D6) are selected to be applied with different voltage again, so as to generate different refraction degrees according to different voltage application condition, such that the second light generates a different refraction to form the second light path $L_{path2}$, thus it can generate the first position P1 and the second position P2. Besides, the electrode (U) under the upper glass 43 is continuously turned on.

Besides, under the arrangement of the second type light modulating unit 24, the distance R between the first position p1 and the second position p2 is set to 2 mm to 4 mm that is slightly shorter than the pupil distance.

The controller 25 can continuously change the voltage of the electrodes of the liquid crystal lens 40 by the first signal and the second signal, so that the lights can continuously and alternatively form the first light path $L_{path1}$ and the second light path $L_{path2}$, wherein the distance R can be regarded as the size of a swing.

Under such concept, the liquid crystal lens 40 can be replaced by a real lenticular lens connected to a vibration device, and the lenticular lens generates swinging by the vibration, so as to change the refraction degrees for achieving the same effect, wherein the vibration device can be, but not limited to, a micro motor, i.e. the real lenticular lens is swung by mechanism.

Figure 5A:
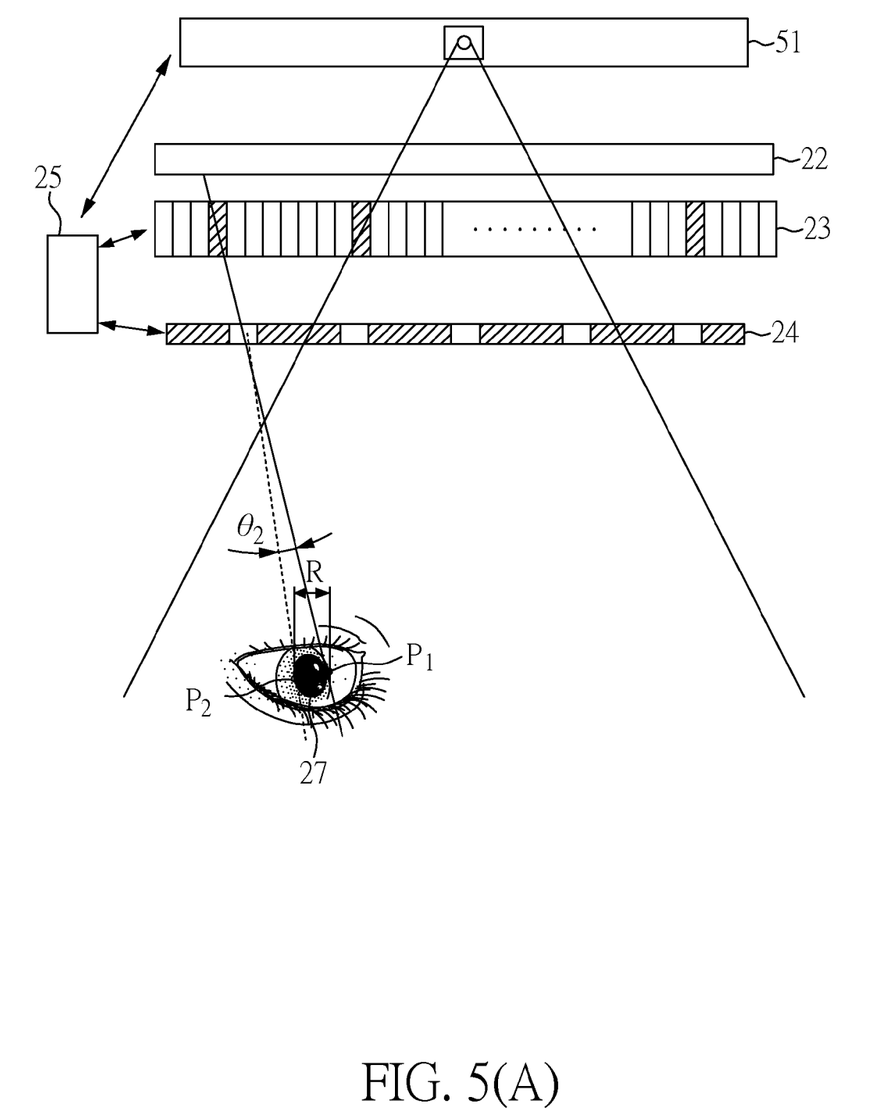
FIG. 5(A) is a schematic diagram of a pupil detecting device.

The 3D image display device in the invention can further include a pupil detecting device 51, as shown in FIG. 5(A). The pupil detecting device 51 can be applied to the first type and second type of the light modulating unit 24. The pupil detecting device 51 is used to detect the size and position of the pupil of the observer, and transmit the data of the pupil to the controller 25, so that the controller 25 can determine the arrangement of the light modulating unit 24.

Figure 5B:
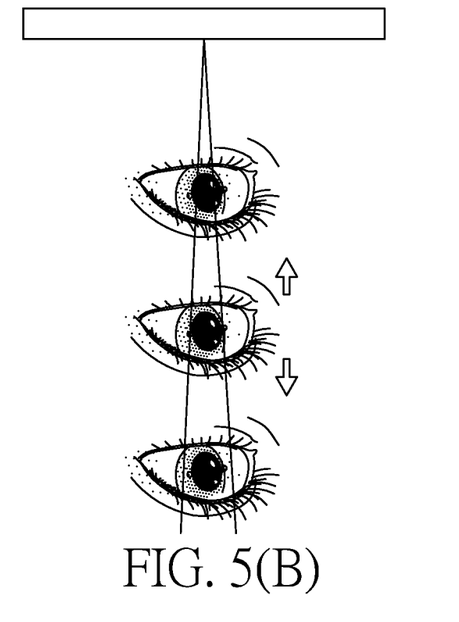
FIG. 5(B) schematically illustrates the condition of changing the distance between the observer and the display device.

Under the condition of using the pupil detecting device 51, the distance R between the first position p1 and the second position p2 can be modified by the pupil detecting device 51. As shown in FIG. 5(B), when the observer changes the distance between the display device 21 and the observer, the positions of the light paths on the pupil are changed too, resulting in failing to provide a good quality 3D image effect. Therefore, it is necessary to modify the light paths based on the position of the pupil detected by the pupil detecting device 51.

Figure 5C:
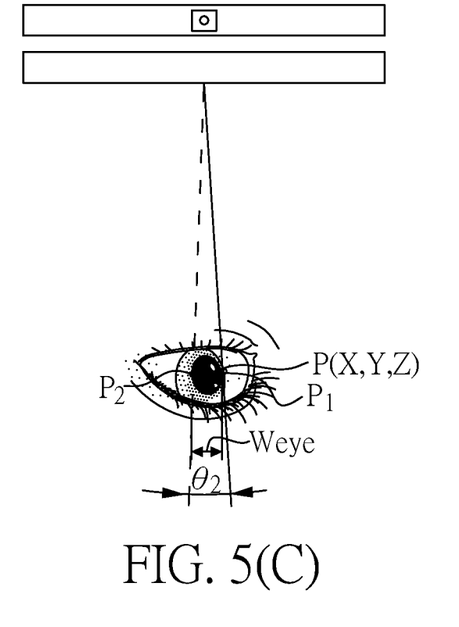
FIG. 5(C) schematically illustrates the condition that the pupil detecting device detects the position of the pupil.

FIG. 5(C) schematically illustrates the condition that the pupil detecting device 51 detects the position of the pupil. The pupil detecting device 51 can detect the position and diameter of the pupil by using any existing image processing method (e.g. transmitting some light to detect the edge of the pupil), so as to obtain the data of the position on the 3D coordinate P(x,y,z) and the diameter Weye of the pupil, and then transmit the data to the controller 25. According to P(x,y,z) and Weye, the controller 25 reconfigures the acute angle θ2 between the first light path $L_{path1}$ and the second light path $L_{path2}$, thereby reconfiguring the first position p1 and the second position p2. The acute angle satisfied the following formula:

$$\theta 2 = k3 \tan^{-1}(Weye/\sqrt{x^2+y^2+z^2}) \quad (3),$$

wherein k3 is a constant of 0.8 to 1.0, Weye is the diameter of the pupil, and (x,y,z) is the 3D coordinate of the center of the pupil.

Accordingly, the controller 25 reconfigures the arrangement in the light modulating unit 24, so that the first light path $L_{path1}$ and the second light path $L_{path2}$ are reconfigured.

As a result, the first embodiment can allow the observer to see 3D image by single eye, and can decrease the resolution loss.

Figure 6A:
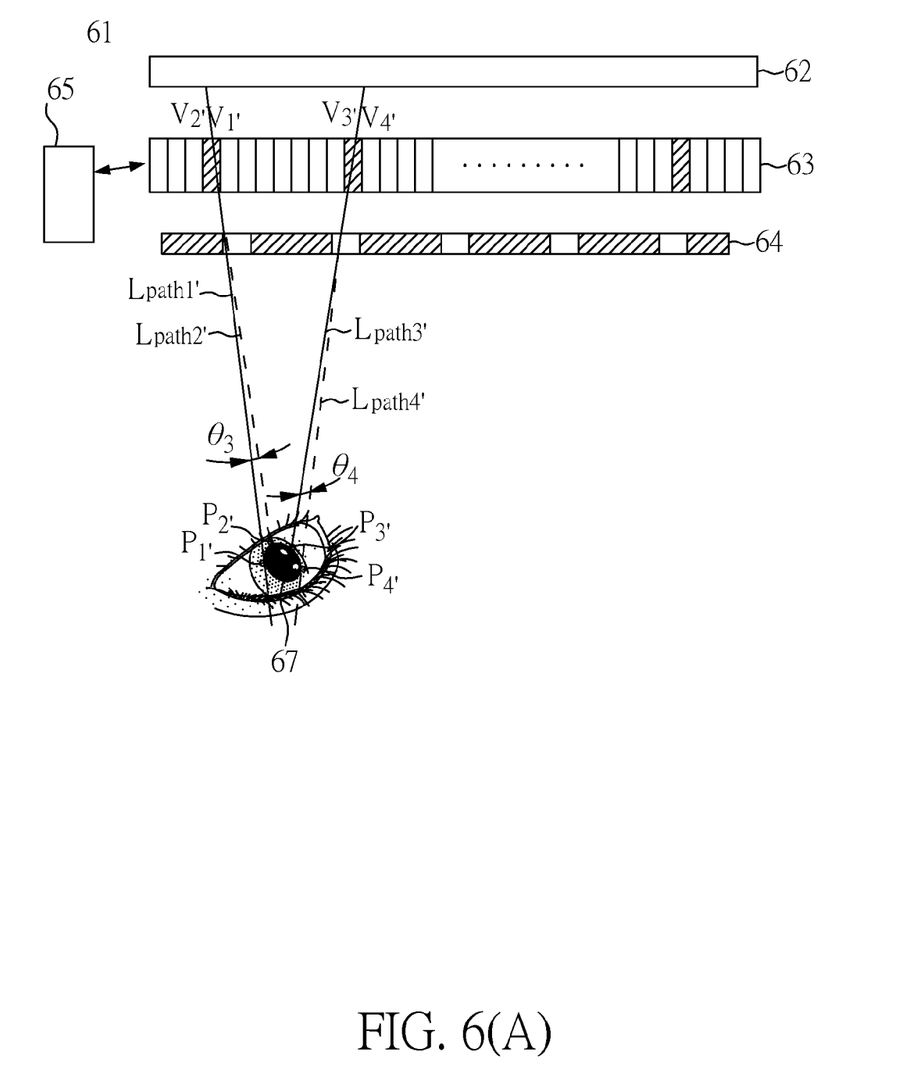
FIG. 6(A) schematically illustrates the structure of the 3D image display device according to a second embodiment of the invention.

FIG. 6(A) schematically illustrates the structure of the 3D image display device 61 according to the second embodiment of the invention. The 3D image display device 61 includes a backlight unit 62, a display panel 63, a light modulating unit 64, and a controller 65. The light modulating unit 64 may be a switchable barrier, a LC GRIN lens, a real lens, a fixed barrier or a switchable LC barrier. In this embodiment, the light modulating unit 64 is switchable barrier. The backlight unit 62 is used to generate an original light, and provide back light to the image. The display panel 63 has a plurality of pixels for generating an image and is deposited between the backlight unit 62 and the light modulating unit 64. The light modulating unit 64 has a plurality of barrier regions. The controller 65 is connected to the display panel 63 for providing a first signal to control the display panel 63 in the first time, and for providing a second signal to the display panel in a second time. When the 3D image display device 61 is operated, the controller 65 provides the first signal to the display panel 63 on a first image region 66 in the first time, and provides the second signal to the display panel 63 on the first image region 66 in the second time. Besides, the controller 65 provides the first signal to the display panel 63 on a second image region 66' in the first time, and provides the second signal to the display panel 63 on the second image region 66' in the second time.

The display panel 63 generates an image (i.e. a full image) according to the signal transmitted from the controller 65. The image can be divided into a plurality of image regions 66, 66'. The light passes through the image region 66, 66' can be formed to filed of views via the barrier device 64. The number of filed of views is preferred to be far less than 72. For example, the image region 66 is formed to merely 8 filed of views which are far less than 72 to 128 light paths as described in the art.

With reference to FIG. 6(A) again, the original light passes through a first image of the first frame V1' and passes through the display panel 63 according to the first signal to generate a first light in the first time. The first light passes through the light modulating unit 64 to form a first light path $L_{path1}'$, and the first light has a first position p1' on an objective plane 67 parallel to the display panel 63. The original light passes through a second image of the second frame V2' and passes through the display panel 63 according to the second signal to generate a second light in the second time. The second light passes through the light modulating unit 64 to form a second light path $L_{path2}'$, and the second light has a second position p2' on the objective plane parallel to the display panel 63, the second position p2' is different from the first position p1'. Wherein, an acute angle θ3 is formed between the first light path first light path $L_{path1}'$ and the second light path $L_{path2}'$, and the acute angle θ3 is 0.2 to 0.4 degrees.

The first image of the first frame V1' and the second image of the second frame V2' are generated on same image regions on the display panel 63 in different times. Besides, the objective plane 67 is preferred but not limited to be a pupil of the observer and, for clear description, the objective plane 67 is defined as a pupil hereinafter.

Because the distance between the first time and the second time is very short, the observer regards the first image of the first frame V1' of the first position p1' on observer pupil and the second image of the second frame V2' of the second position p2' on observer pupil as an image merely presented at the same time, and thus the first image of the first frame V1' of the first position p1' and the second image of the second frame V2' of the second position p2' can be regarded as a 3D image data. That is to say, when the first image of the first frame V1' of all pixels are presented on the first position p1' of the pupil and the second image data V2' of all pixels are presented on the second position p2' of the pupil, the observer can see the 3D image by one eye.

Besides, the light modulating unit 64 can be a device with a fixed inner arrangement, so that the first light path $L_{path1}'$ and the second light path $L_{path2}'$ are formed by the first image of the first frame V1' and the second image of the second frame V2' generated on different image regions of the display panel 63 in this embodiment, thus the controller 65 doesn't need to be connected to the light modulating unit 64.

Figure 6B:
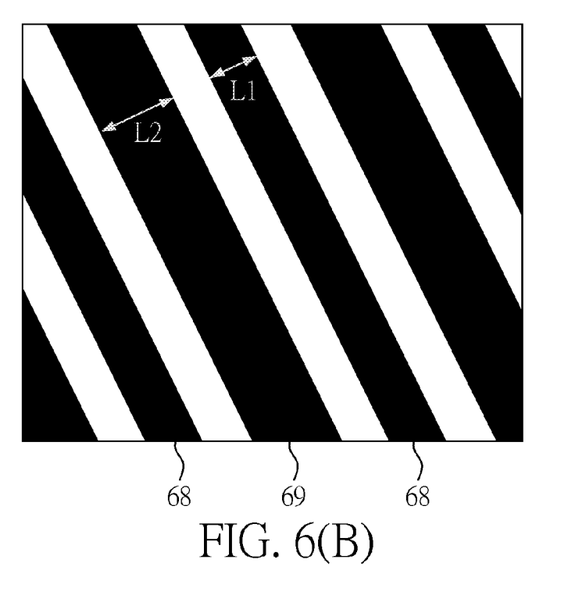
FIG. 6(B) is a top view of the light modulating unit of the second embodiment.

FIG. 6(B) is a top view of the light modulating unit 64 according to the second embodiment of the invention. In this embodiment, on the light modulating unit 64 is a real barrier device (i.e. mechanistic barrier device).The light modulating unit 64 has a plurality of first barrier regions 68 and a plurality of second barrier region 69, and the first barrier regions 68 and the second barrier region 69 are fixed on the barrier device 64. But in another embodiment, the barrier device 64 is a switchable device that the first barrier regions 68 and the second barrier region 69 are repeatedly switched. Besides, the first barrier regions 68 and the second barrier region 69 can be presented by liquid crystal, i.e. the light modulating unit 64 can be a switchable liquid crystal barrier having a plurality of electrodes in another embodiments.

The first barrier regions 68 and the second barrier regions 69 are preferred but not limited to be alternatively arranged on the barrier device 64. Besides, the sizes of the intervals between the first barrier regions 68 and the second barrier regions 69 are preferred but not limited to be the same. Each first barrier region 68 and each second region 69 have different widths (short sides) but the same length (long sides). The first barrier regions 68 and the second barrier regions 69 are preferred but not limited to be parallelograms, and are preferred not to be rectangles.

In addition, a width of the first barrier region 68 is L1, and a width of the second barrier region 69 is L2, the difference L3 between the width of the first barrier region 68 and the width of the second barrier region 69 on FIG. 6(B) satisfies the following formula:

$$L3=L2-L1=2\times(k\times W_{pupil}/IPD)\times W_{sub\text{-}pixel} \quad (1),$$

where k is a constant of 1 to 2 that is defined by multiview 3D design, $W_{pupil}$ is a pupil diameter of the observer (usually 2 mm to 4 mm), IPD is a distance between the centers of two pupils of the observer (usually 65 mm) and $W_{sub\text{-}pixel}$ is a sub-pixel width.

Furthermore, the materials of first barrier regions 68 and the second barrier regions 69 can be any material capable of blocking the light, so as to change the path of the light.

In addition, with the arrangement of the barrier device 64, the system 61 can generate another different light path. As shown in FIG. 6(A) again, in the first time, the original light passes through the display panel 63 according to the first signal to generate a third light, the third light passes through a third image of the first frame V3' and passes through the light modulating unit 64 to form a third light path $L_{path3}'$ and has a third position p3' on the objective plane 67 parallel to the display panel 63, wherein the third position p3' and the first position p1' are different. Similarly, in the second time, the original light passes through a forth image of the second frame V4' and passes through the display panel according to the second signal to generate a forth light, the forth light passes through the light modulating unit 64 to form a fourth light path $L_{path4}'$ and has a fourth position p4' on the objective plane 67 parallel to the display panel 63, wherein the fourth position p4' and the second position p3' are different. Thus, when the observer moves, the observer can see the 3D image composed by the image data of the third position p3' and the fourth position p4'. That is, this embodiment can provide the 3D images with different display directions.

The third image of the first frame V3' and the forth image of the second frame V4' are generated on same image regions on the display panel 63 in different times.

In addition, an acute angle θ4 between the third light path L$_{path3}$' and the forth light path L$_{path4}$'. The acute angle θ4 is preferred but not limited to be 0.2 to 0.4 degrees.

In view of the foregoing description, it is known that the invention provides at least two embodiments of the 3D image display device, with which the observer can see a 3D image by single eye, and the resolution loss of the 3D image can be greatly decreased.

Although the present invention has been explained in relation to its preferred embodiment, it is to be understood that many other possible modifications and variations can be made without departing from the spirit and scope of the invention as hereinafter claimed.

What is claimed is:

1. A 3D image display device, comprising:
   a backlight unit for generating an original light;
   a display panel having a plurality of pixels;
   a light modulating unit, wherein the display panel deposited between the backlight unit and the light modulating unit; and
   a controller connected to the display panel and the light modulating unit, the controller providing a first signal to both of the display panel and the light modulating unit in a first time, and providing a second signal to both of the display panel and the light modulating unit in a second time, wherein the first time is different from the second time;
   wherein the original light passes through the display panel according to the first signal to generate a first light in the first time, the first light passes through the light modulating unit, and has a first position on an objective plane parallel to the display panel; and the original light passes through the display panel according to the second signal to generate a second light in the second time, the second light passes through the light modulating unit, and has a second position on the objective plane, and the first position is different from the second position.

2. The 3D image display device of claim 1, wherein the first signal has a first frequency, the second signal has a second frequency, and the first frequency is different from the second frequency.

3. The 3D image display device of claim 1, wherein the first light generates a first light path, the second light generates a second light path, and the first light path and the second light path form an acute angle.

4. The 3D image display device of claim 3, wherein the acute angle is 0.2 to 0.4 degrees.

5. The 3D image display device of claim 1, wherein the light modulating unit is a switchable liquid crystal barrier having a plurality of electrodes.

6. The 3D image display device of claim 5, wherein the switchable liquid crystal barrier has a first electrode, a second electrode and a third electrode arranged in sequence, a distance between a left edge of the first electrode and a left edge of the second electrode and a distance between a right edge of the second electrode and a right edge of the third electrode are same.

7. The 3D image display device of claim 6, wherein the distance between a left edge of the first electrode and a left edge of the second electrode satisfied the following formula:

$$L=(k\times W_{pupil}/IPD)\times W_{sub-pixel},$$

where k is a constant of 1 to 2, W$_{pupil}$ is a diameter of the objective plane, W$_{sub-pixel}$ is a sub-pixel width.

8. The 3D image display device of claim 6, wherein the switchable liquid crystal barrier is a switchable lens, the switchable lens is swung by applying different voltages on the electrodes to generate the first position and the second position.

9. The 3D image display device of claim 1, further comprising a pupil detecting device, wherein the first position and the second position are determined according to the size and position of the pupil detected by the pupil detecting device.

10. The 3D image display device of claim 1, wherein the light modulating unit comprises a real lens, the real lens is swung by mechanism.

11. A 3D image display device, comprising:
    a backlight unit for generating an original light;
    a display panel having a plurality of pixels;
    a light modulating unit, wherein the display panel deposited between the backlight unit and the light modulating unit; and
    a controller connected to the display panel for providing a first signal to the display panel in a first time; and for providing a second signal to the display panel in a second time;
    wherein the original light passes through the display panel according to the first signal to generate a first light in the first time, and the first light passes through the light modulating unit, and has a first position on an objective plane parallel to the display panel; and the original light passes through the display panel according to the second signal to generate a second light in the second time, the second light passes through the light modulating unit, and has a second position on the objective plane parallel to the display panel, and the first position is different from the second position.

12. The 3D image display device of claim 11, wherein light modulating unit is a switchable liquid crystal barrier having a plurality of electrodes.

13. The 3D image display device of claim 11, wherein light modulating unit comprise a plurality of first regions and a plurality of second regions, and the first regions and the second regions are alternatively arranged on the light modulating unit.

14. The 3D image display device of claim 13, wherein light modulating unit is a barrier device.

15. The 3D image display device of claim 14, wherein the difference L3 between the width of the first barrier region and the width of the second barrier region satisfied the following formula:

$$L3=2\times(k\times W_{pupil}/IPD)\times W_{sub-pixel},$$

where k is a constant of 1 to 2, W$_{pupil}$ is a pupil diameter of an observer, IPD is a distance between the centers of two pupils of the observer and W$_{sub-pixel}$ is a sub-pixel width.

16. The 3D image display device of claim 11, wherein the original light passes through the display panel according to the first signal to generate a third light in the first time, the third light passes through the light modulating unit, and has a third position on an objective plane parallel to the display panel, and the first position is different from the third position.

17. The 3D image display device of claim 11 wherein the first light generators a first light path, the second light generators a second light path, an acute angle is formed between the first light path and the second light path, and the acute angle is 0.2 to 0.4 degrees.

* * * * *